US009886872B2

(12) United States Patent
Blansett et al.

(10) Patent No.: US 9,886,872 B2
(45) Date of Patent: Feb. 6, 2018

(54) HYDRAULIC TRAINING SYSTEM AND METHOD

(71) Applicant: Eaton Corporation, Cleveland, OH (US)

(72) Inventors: Thomas Evans Blansett, Temperance, MI (US); Rodney Bruce Erickson, Savage, MN (US)

(73) Assignee: EATON CORPORATION, Cleveland, OH (US)

( * ) Notice: Subject to any disclaimer, the term of this patent is extended or adjusted under 35 U.S.C. 154(b) by 696 days.

(21) Appl. No.: 14/303,275

(22) Filed: Jun. 12, 2014

(65) Prior Publication Data

US 2015/0079550 A1 Mar. 19, 2015

Related U.S. Application Data

(60) Provisional application No. 61/834,124, filed on Jun. 12, 2013.

(51) Int. Cl.
*G09B 9/00* (2006.01)
*G09B 23/12* (2006.01)
*G09B 5/00* (2006.01)

(52) U.S. Cl.
CPC ............ *G09B 23/12* (2013.01); *G09B 5/00* (2013.01); *G09B 9/00* (2013.01)

(58) Field of Classification Search
CPC ........ G09B 25/025; G09B 25/02; G09B 9/00; F15B 18/00; F15B 15/2815; F15B 15/2807; B64C 13/00
USPC ....................................................... 434/126
See application file for complete search history.

(56) References Cited

U.S. PATENT DOCUMENTS

| 3,363,340 | A | | 1/1968 | McKinley | |
|---|---|---|---|---|---|
| 3,930,587 | A | * | 1/1976 | Bliss | B65G 1/0407 414/664 |
| 4,466,294 | A | * | 8/1984 | Bennington | G01M 15/044 73/116.05 |
| 4,497,606 | A | * | 2/1985 | Hobson | B66F 9/12 414/607 |
| 4,497,607 | A | * | 2/1985 | Johannson | B66F 9/12 403/110 |
| 5,009,067 | A | | 4/1991 | Bonnell | |
| 5,078,608 | A | * | 1/1992 | Finlay | A63H 33/3044 434/219 |
| 5,178,543 | A | | 1/1993 | Semans et al. | |

(Continued)

FOREIGN PATENT DOCUMENTS

EP 1 102 230 A2 5/2001

OTHER PUBLICATIONS

MF500-HT-TSE Hydrostatic Transmission Training Simulator, Fluid Power Training Systems, 10 pages (Jan. 29, 2013).

*Primary Examiner* — Robert J Utama
(74) *Attorney, Agent, or Firm* — Merchant & Gould P.C.

(57) ABSTRACT

A hydraulic training system includes a cart, with a fluid reservoir, a motor, a first pump and a second pump situated on the cart. The first and second pumps are in fluid communication with the fluid reservoir and are operatively connected to be driven by the motor. A drivable wheel is rotatably attached to the cart and is selectively connectable to the first pump to drive the wheel. A steering system is selectively connectable to the second pump and arranged to steer a steerable wheel extending from the top of a first planar surface.

30 Claims, 13 Drawing Sheets

(56) References Cited

U.S. PATENT DOCUMENTS

| | | | | |
|---|---|---|---|---|
| 5,354,203 A | * | 10/1994 | Kotch | G09B 25/025 434/126 |
| 5,363,738 A | * | 11/1994 | Kotch | G09B 9/00 91/1 |
| 5,372,508 A | | 12/1994 | Hautzenroder | |
| 5,484,030 A | * | 1/1996 | Glenn | A63G 25/00 180/21 |
| 6,068,086 A | * | 5/2000 | Bushong | B66F 9/16 187/237 |
| 6,089,593 A | * | 7/2000 | Hanson | A61G 5/006 280/250.1 |
| 9,315,180 B2 | * | 4/2016 | Jungbecker | B60T 8/4081 |
| 2009/0176197 A1 | * | 7/2009 | Vogt | G09B 23/12 434/302 |
| 2010/0269683 A1 | * | 10/2010 | Anderson | B60T 7/042 91/369.1 |
| 2012/0169112 A1 | * | 7/2012 | Jungbecker | B60T 8/4081 303/9.75 |
| 2014/0144732 A1 | * | 5/2014 | Bayer | B60T 7/042 188/106 P |
| 2016/0232814 A1 | * | 8/2016 | Smith | G09B 9/042 |

\* cited by examiner

FIG. 11B

HYDRAULIC TRAINING SYSTEM AND METHOD

CROSS REFERENCE TO RELATED APPLICATION

This application claims the benefit of provisional application Ser. No. 61/834,124, filed Jun. 12, 2013, which is incorporated herein by reference in its entirety.

BACKGROUND

The present disclosure relates generally to a mobile hydraulic training system. Providing proper training for operators and maintainers of hydraulic systems and equipment is necessary for efficient and safe use of such equipment. However, training on hydraulic systems in a classroom setting can be challenging, since the equipment itself tends to be big, loud, dirty, etc. Known training and simulation systems often are also big, and not sufficiently portable. Further, components used in such systems are typically configured to demonstrate simple hydraulic circuits, rather than provide training on components representative of those found in representative hydraulic equipment.

Improvements in hydraulic training and simulation systems are desired.

SUMMARY

In accordance with aspects of the present disclosure, a hydraulic training includes a cart that has a first planar surface oriented horizontally and having a top and a bottom. First and second opposing sides of the first planar surface define a length dimension, and first and second opposing ends define a width dimension. The first and second sides and the first and second ends define a perimeter of the first planar surface. A fluid reservoir, a motor, and a first pump are situated on the cart. The first pump is in fluid communication with the fluid reservoir and is operatively connected to be driven by the motor. A drivable wheel is rotatably mounted to the cart and extends from the top of the first planar surface. The drivable wheel is selectively connectable to the first pump to rotate the drivable wheel. A second pump is situated on the cart and in fluid communication with the fluid reservoir and is operatively connected to be driven by the motor. A steerable wheel is pivotally connected to, and extends from, the top of the first planar surface. A steering system is situated on the cart and is selectively connectable to the second pump to steer the steerable wheel. The reservoir, the motor, the first pump, the second pump, the rotatable wheel, and the steering system do not extend beyond the first and second sides of the first planar surface. Among other things, this arrangement facilitates moving the cart through narrow openings, such as a standard door opening.

In some embodiments, the reservoir, the motor, the first pump, and the second pump are situated below the first planar surface. The system may also include, for example, a second planar surface below and parallel to the first planar surface. The second planar surface has a top and a bottom, with the bottom of the first planar surface facing the top of the second planar surface. The reservoir, the motor, the first pump, and the second pump are situated between first planar surface and the second planar surface.

In accordance with further aspects of the disclosure, a hydraulic training system includes a cart with a first planar surface oriented horizontally and having a top and a bottom. First and second opposing sides define a length dimension, and first and second opposing ends define a width dimension. The first and second sides and the first and second ends define a perimeter. A fluid reservoir and a motor are situated on the cart. A pump is situated on the cart and is in fluid communication with the fluid reservoir and operatively connected to be driven by the motor. A fork is pivotally connected to a carriage such that the fork has a deployed position wherein the fork extends beyond the first side of the first planar surface, and a stowed position wherein the fork does not extend beyond the first side of the first planar surface. A pair of rails extend from the bottom of the first planar surface perpendicular thereto, and the rails slidably receive the carriage. A first hydraulic cylinder is operable to move the carriage slidably in the rails. An operator control extends from the top of the first planar surface. The pump is connectable to the operator control and the first hydraulic cylinder to move the fork in response to the operator control. Some embodiments may also include a second hydraulic cylinder operable to tilt the fork, with the second pump being connectable to drive the second hydraulic cylinder in response to the operator control.

In accordance with still further aspects of the disclosure, a method includes providing a cart with casters and a first planar surface. The first planar surface is oriented horizontally and has a top and a bottom, first and second opposing sides defining a length dimension, and first and second opposing ends defining a width dimension. The first and second sides and first and second ends define a perimeter. A fluid reservoir and first and second pumps are situated on the cart such that the first and second pumps are in fluid communication with the fluid reservoir. A drivable wheel that is rotatably attached to the cart is connected to the first pump to rotate the rotatable wheel and simulate vehicle propulsion. A steering system including a steering wheel extending from the top of the first planar surface is connected to a steerable wheel pivotally attached to, and extending from, the top of the first planar surface and the second pump to steer the rotatable wheel in response to the steering wheel.

BRIEF DESCRIPTION OF THE DRAWINGS

FIG. 11 is a schematic diagram of an example of a hydraulic circuit used in the hydraulic simulation and training system shown in FIG. 1.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as top, bottom, front, back, etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense.

In general, this disclosure relates to a mobile hydraulic training and simulator system. Embodiments of the disclosed fluid power training simulator are designed to provide a hands-on system for presenting practical demonstrations of hydraulic systems, specifically mobile applications. In addition, examples of the disclosed system allow an instructor to place a fault within the unit for training regarding trouble shooting. In certain implementations, the system is a single operator simulator with a hydrostatic propel circuit and auxiliary charge circuit that also supplies steering, and lift/tilt functions to simulate the operation of a fork lift. The power unit is capable of supplying a total flow of six gallons per minute (GPM) at 300 psi (three GPM for each of the propel system and auxiliary system) and will operate on a standard 120 VAC 20 amp lighting circuit.

The components mounted in some examples of the training and simulation system are representative of those found in typical mobile hydraulic equipment and allow the students to visually reinforce learning concepts. Components can be connected together through flexible hoses and quick disconnects to configure many variations of mobile hydraulic circuits to reinforce the theory and principles of operations taught in classroom settings.

FIGS. 1-4 illustrate various views of an example of a hydraulic training and simulation system 100 in accordance with aspects of the present disclosure. The system 100 includes a cart 102 with first and second planar surfaces 10, 20 oriented horizontally and situated one above the other such that the bottom 14 of the first planar surface 10 faces the top 22 of the second planar surface 20. The two surfaces 10,20 are generally parallel to one another with supports 31 extending between the surfaces 10,20 to maintain them in a fixed, spaced apart relationship. The surfaces 10,20 are described as generally parallel since they may not be precisely parallel due to factors such as manufacturing variation.

The cart 102 has casters 30 attached to the bottom 24 of the second planar surface 20 so that the system 100 can be moved as desired. The first and second planar surfaces 10,20 of the cart 102 each have first and second opposing sides 103 that define a length dimension l, and first and second opposing ends 104 that define a width dimension w. The first and second sides and the first and second ends thus define a perimeter of the cart 102. In some embodiments, the width dimension w is equal to or less than 36 inches, such that it will fit through a standard door opening. Further, in accordance with certain aspects of the disclosure, the components of the system 100 do not extend beyond the sides 103, at least when in a stowed configuration for moving the system 100, such that the system 100 is easily transportable in a variety of settings.

Figure 1:
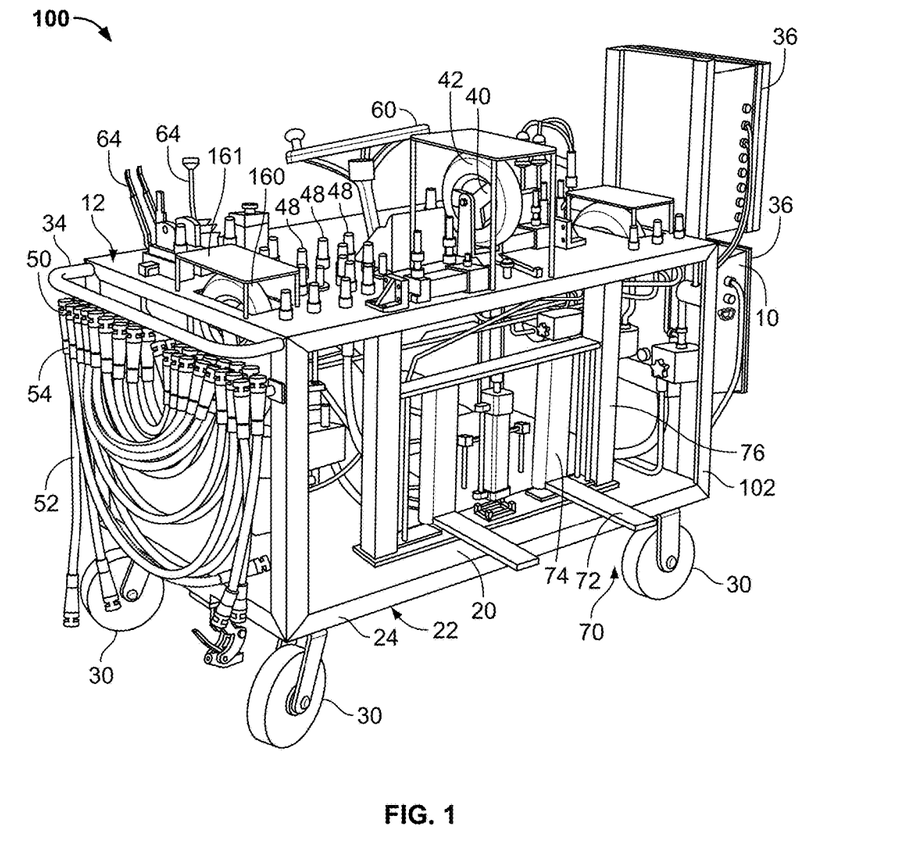
FIG. 1 is a front perspective view illustrating an example of a hydraulic simulation and training system in accordance with aspects of the present disclosure
Figure 2:
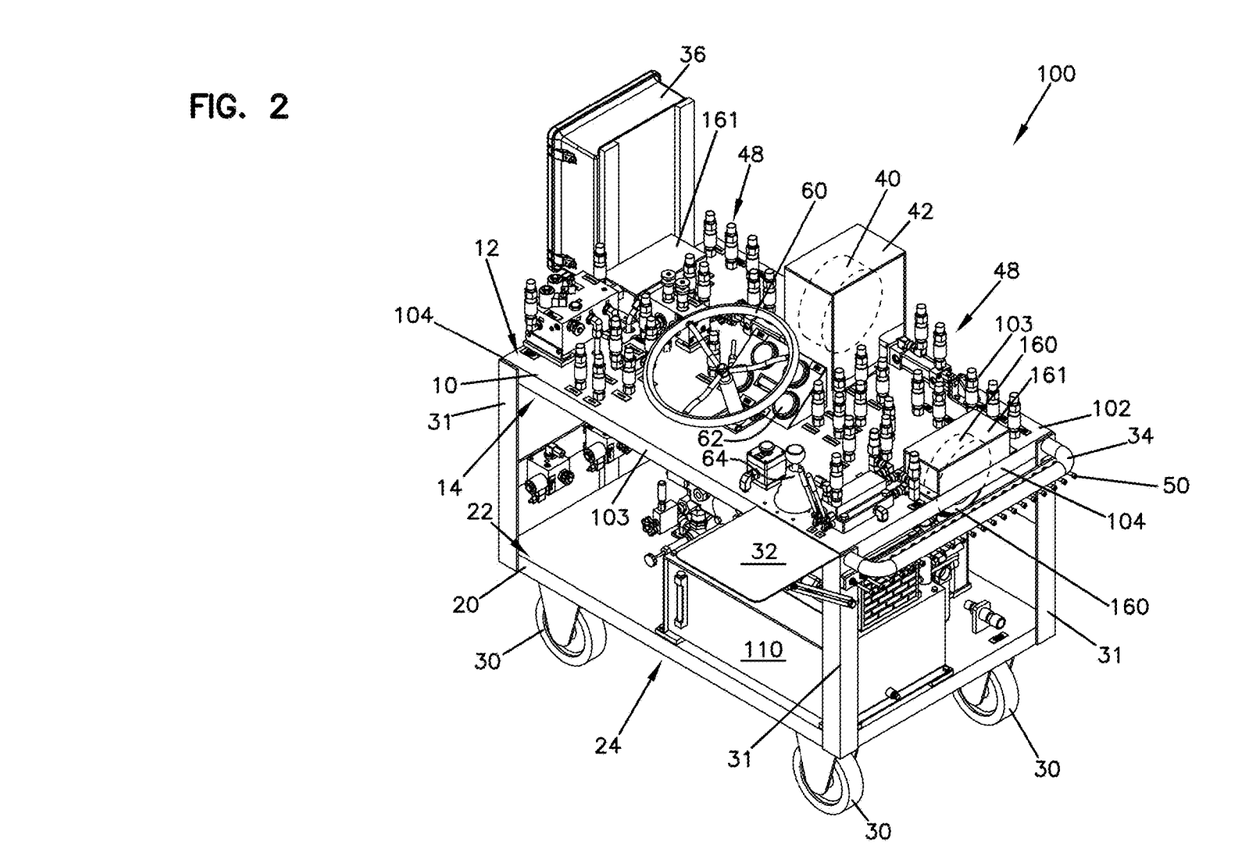
FIG. 2 is a rear perspective view of the example hydraulic simulation and training system shown in FIG. 1.
Figure 3:
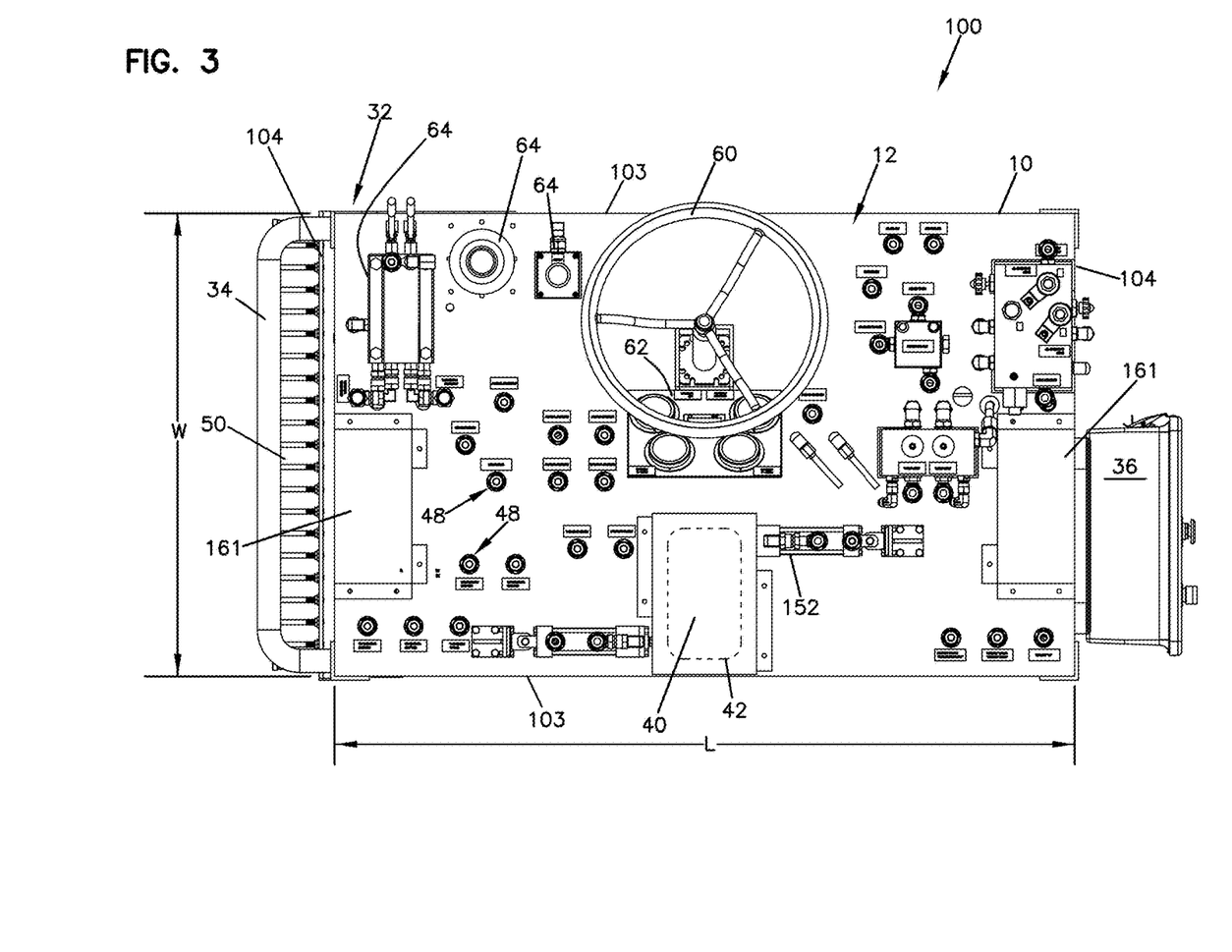
FIG. 3 is a top view of the example hydraulic simulation and training system shown in FIG. 1.
Figure 4:
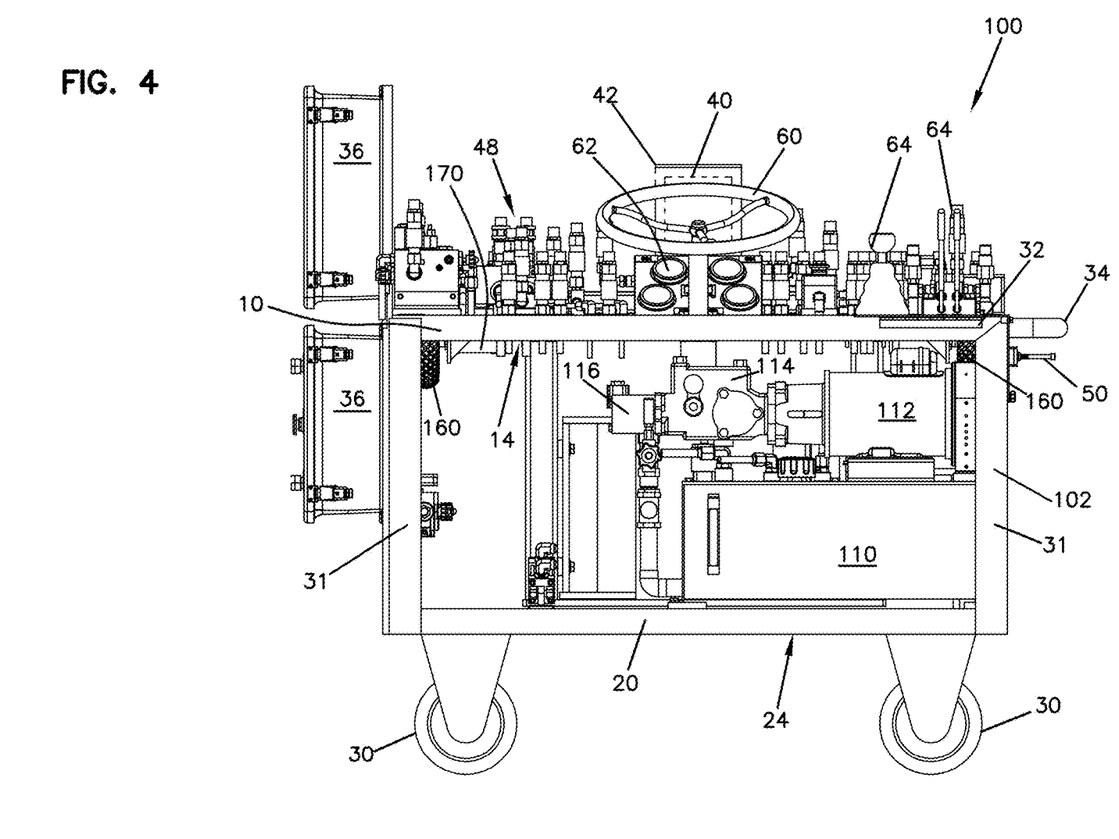
FIG. 4 is a rear view of the example hydraulic simulation and training system shown in FIG. 1.
Figure 5:
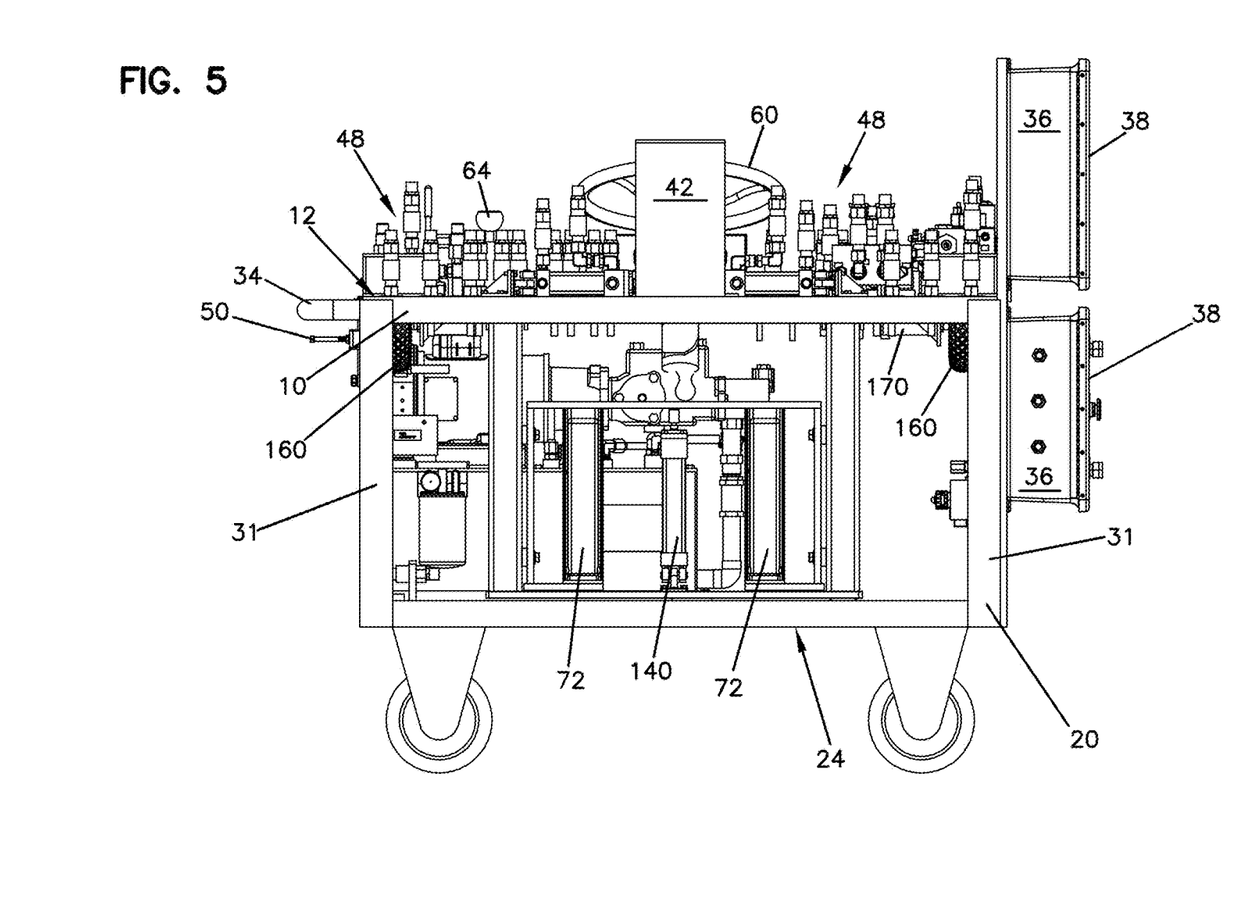
FIG. 5 is a front view of the example hydraulic simulation and training system shown in FIG. 1.

A foldable tray 32 is pivotally attached to first planar surface 10, so that when the tray is in a down or deployed position as shown in FIGS. 2 and 3, it is generally aligned and parallel with the top 12 of the first planar surface 10, extending beyond the side 103 of the cart 102 to provide extra work space when desired. When moving the system 100, it may be desirable to move the tray 32 to an up or stowed position such that the tray extends generally perpendicular to the first planar surface 10 and does not extend beyond the side 103 of the first planar surface 10, thus maintaining the desired width dimension w so that the cart 102 can be moved through a standard doorway, for example.

One end 104 of the cart 102 has a push bar 34 attached thereto, and in some implementations, one or more utility boxes 36 are attached to the opposite end 104. The boxes 36 in the illustrated example include hinged doors 38 with latches to close the doors 38. Attaching items such as the boxes 36 and push bar 34 to ends of the cart 102 also maintains the desired width dimension w, allowing the system 100 to be moved through standard doorways.

As noted above, among other things, the system 100 provides a simulator for training students on various hydraulic systems. The illustrated system 100 includes a plurality of connectors or quick connect devices 48 extending from the top 12 of the first planar surface 10. Flexible hoses 52 with corresponding connectors 54 at the ends thereof compatible with the quick connects 48 are used to configure the system 100 to establish various hydraulic systems for simulation and training. Several pegs 50 extend from an end of the cart 102 below the push bar 34 for storing hoses 52.

Figure 6:
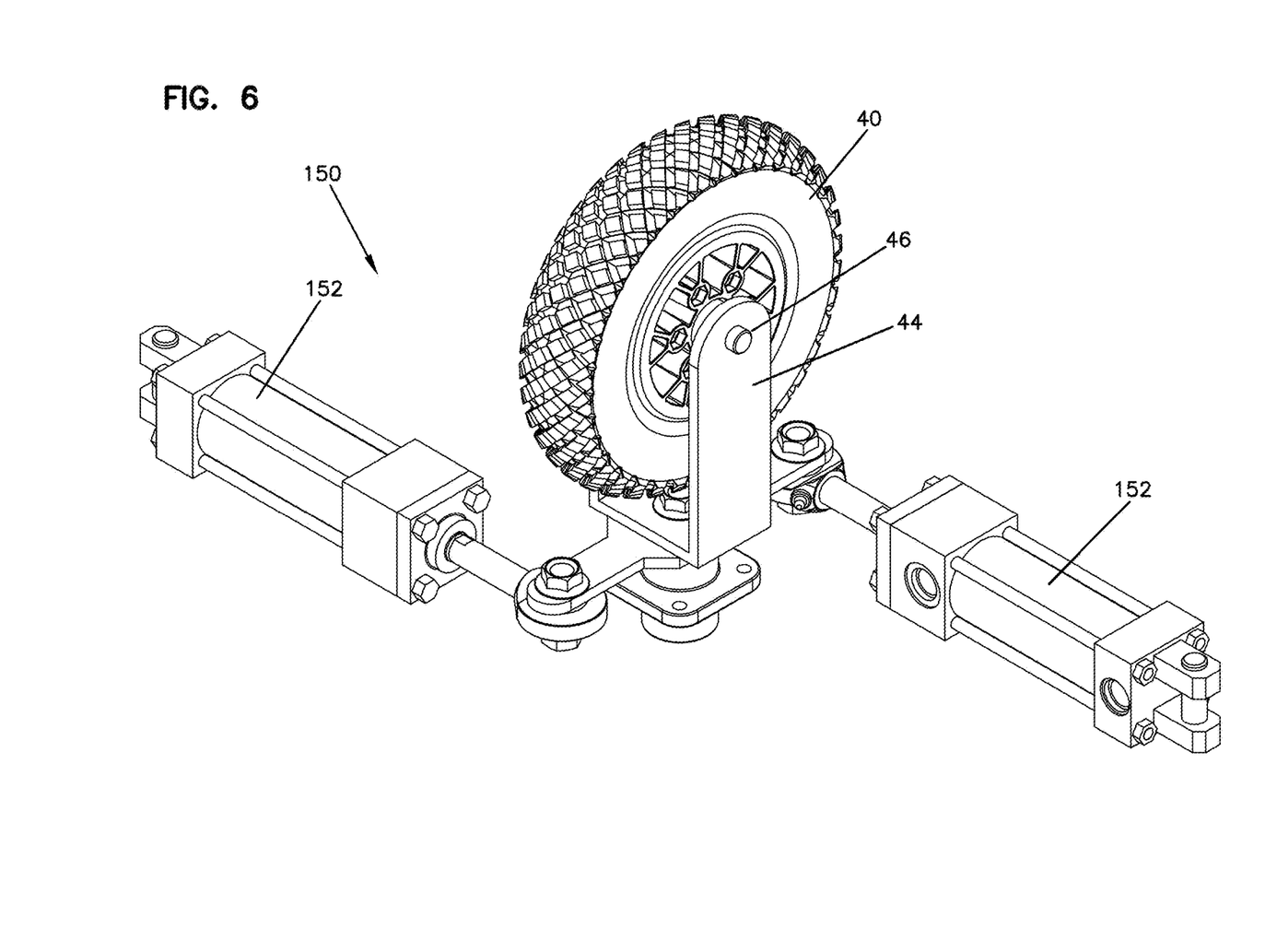
FIG. 6 is a perspective view illustrating an example of a steering system of the hydraulic simulation and training system shown in FIG. 1.

The system 100 includes a steerable wheel 40 extending from the top 12 of the first planar surface 10. The wheel may be covered by an enclosure 42, which is transparent or translucent in some embodiments. The steerable wheel 40 is steered by a hydraulic steering system which are discussed further below. The steerable wheel 40 provides a visual aid for training students on hydraulic steering systems. FIG. 6 illustrates additional aspects of the wheel 40. The wheel 40 is attached to the top surface 12 by a yoke assembly 44 that allows the wheel 40 to rotate about its axel 46 and turn from side to side. The yoke 44 is pivotally attached to the first planar surface 10, such that the wheel 40 extends from the top 12 thereof. The yoke 44 includes opposing legs that receive ends of the axel 46. The steering system 150 includes a pair of hydraulic cylinders 152 that are attached to the yoke assembly 44 for turning the wheel 40 side to side, simulating steering of a device. In the illustrated example, the steering system 150 includes a steering wheel 60 that extends from the top 12 of the first planar surface 10, and operates the pistons 152 for pivoting the wheel 40 from side to side. Various additional operator indicators 62 and controls 64 are provided on the top 12 of the first planar surface 10 for training purposes.

A fluid reservoir 110 and a motor 112 are situated on the cart 102 between the first planar surface 10 and the second planar surface 20. In the illustrated system 100, the reservoir 110 is fastened to the top 22 of the second planar surface, and the motor 112 is positioned on top of the reservoir 110. First and second pumps 114,116 are also situated on the cart 102 between the first planar surface 10 and the second planar surface 20. In other embodiments, the reservoir 110, the motor 112, the first pump 114, and the second pump 116 may be positioned elsewhere.

At least one drivable wheel 160 is rotatably mounted to the cart and selectively connectable to the first pump 114 to rotate the drivable wheel 160. In the illustrated embodiment, there are two drivable wheels 160 connected to the cart 102 at opposite ends 104 thereof. The drivable wheels 160 are positioned such that at least a portion extends above the top side 12 of the first planar surface 10. In the illustrated embodiment, the drivable wheels 160 are covered by an enclosure 161, which is transparent or translucent in some embodiments so that at least a portion of the drivable wheels 160 are visible at the top surface 12 to provide a visual aid for training students on propulsion systems. Thus, the items desirable for viewing during training and simulation are accessible and visible on the top 12 of the first surface 10, allowing a group of students gathered around the cart 102, for example, to view and access the steering wheel 60, operator indicators 62, controls 64, steerable wheel 40, drivable wheels 160, etc.

Figure 7:
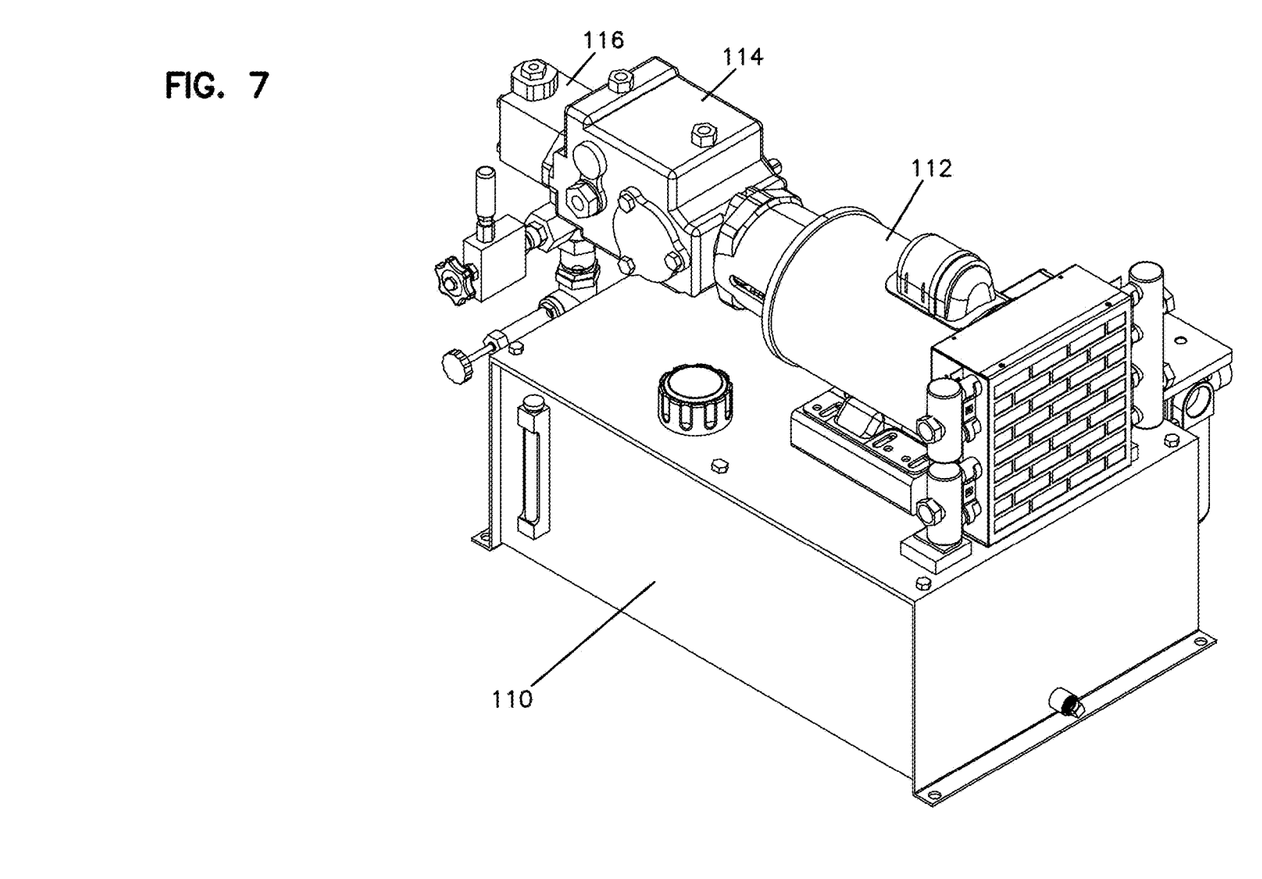
FIG. 7 is a first perspective view illustrating an example of reservoir, motor and pump systems of the hydraulic simulation and training system shown in FIG. 1.
Figure 8:
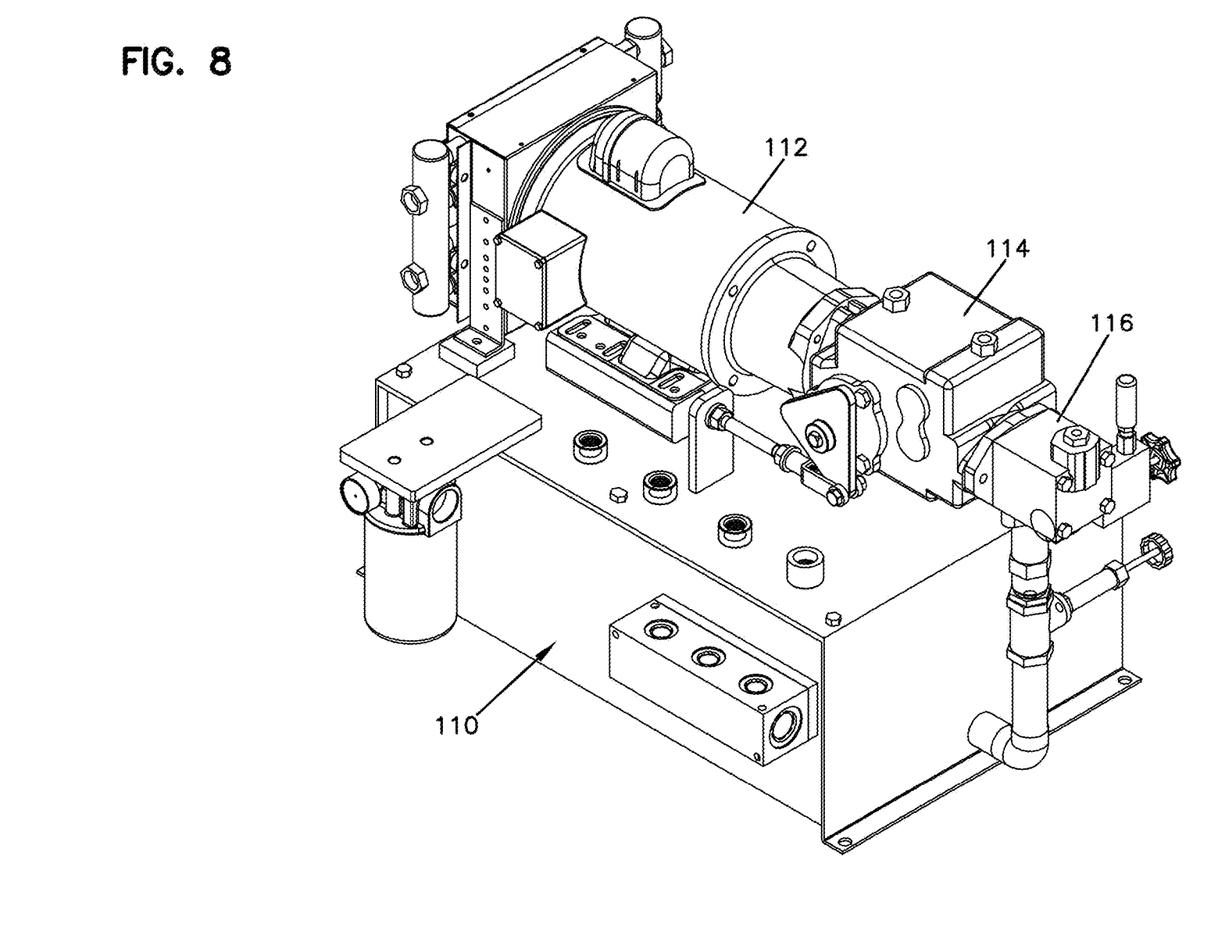
FIG. 8 is a second perspective view of the reservoir, motor and pump systems shown in FIG. 7.

Examples of the fluid reservoir 110, motor 112, pumps 114,116 and associated components are illustrated in FIGS. 7 and 8. Both pumps 114,116 are in fluid communication with the fluid reservoir 110 and operatively connected to be driven by the motor 112. In some examples, the first pump 114 is a hydrostatic piston pump that is connectable via the quick connects 48 and hoses 52 to drive the wheel 160. The second pump 116, for example, is a hydraulic vane pump that drives an auxiliary charge circuit for steering and other functions. The second pump 116 is connectable via the quick connects 48 and hoses 52 to the steering system 150 including the steering mechanism 60 and pistons 152 for steering the wheel 40. The motor 112 includes a shaft that drives the first pump 114 via a push/pull lever 118 and the second pump 114.

Figure 9:
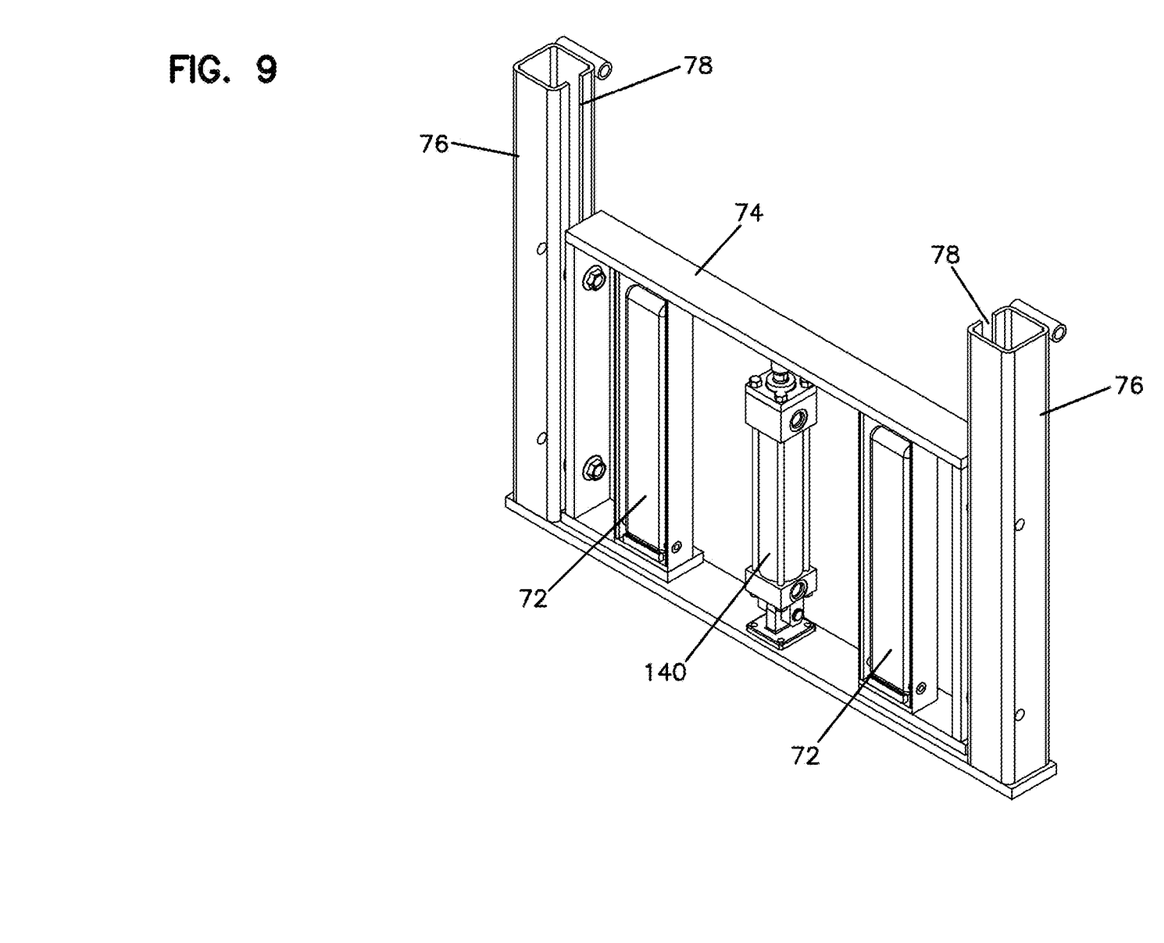
FIG. 9 is a perspective view illustrating a fork lift simulation system of the hydraulic simulation and training system shown in FIG. 1.
Figure 10:
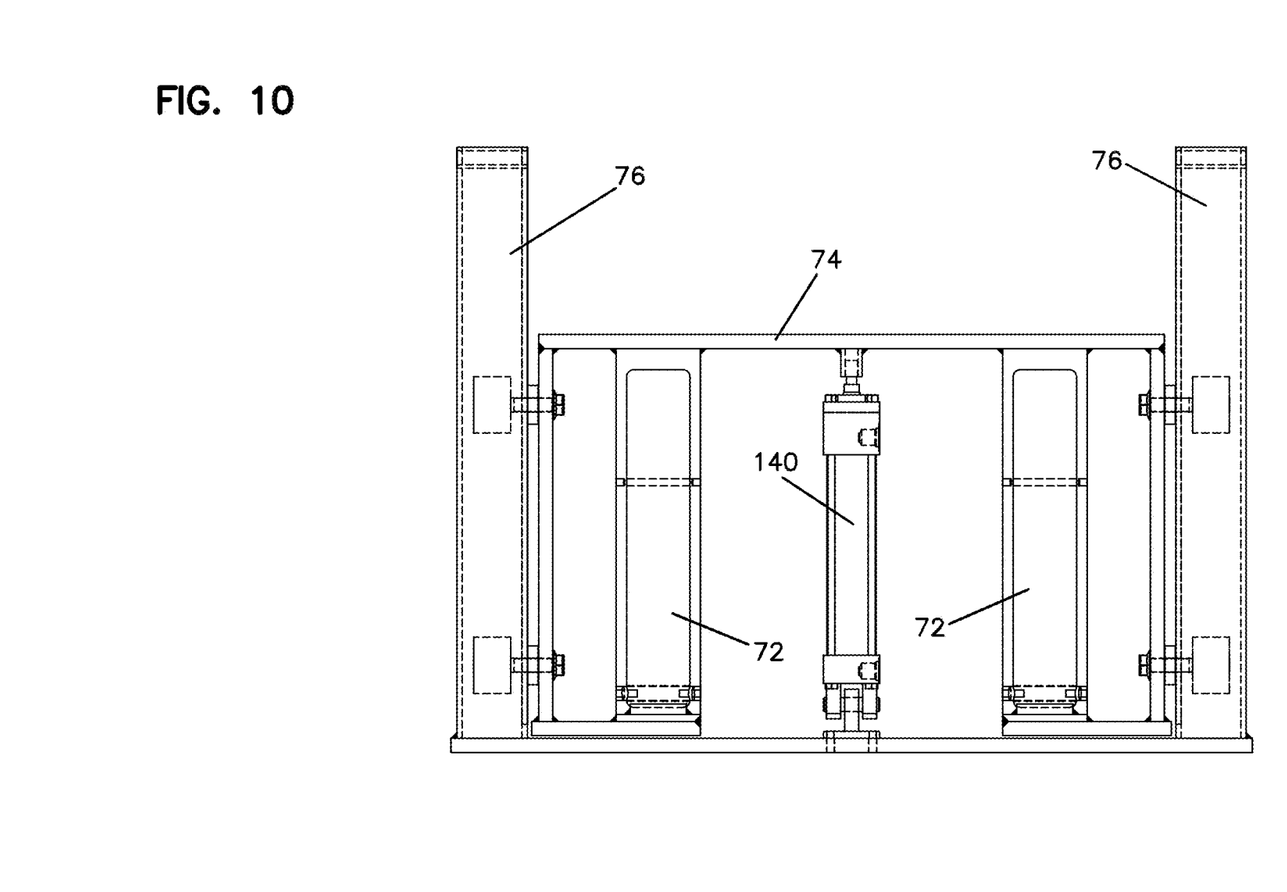
FIG. 10 is a front view of the fork lift simulation system shown in FIG. 9.

Among other things, the system 100 can be configured to simulate a fork lift. Accordingly, the system 100 includes a fork lift simulation assembly 70 attached to the cart 102 between the first and second planar surfaces 10, 20. FIGS. 9 and 10 illustrate an example of the fork lift simulation assembly 70, which includes at least one fork 72. In the illustrated assembly 70, a pair of forks 72 are pivotally connected to a carriage 74. The forks 72 can be pivoted to a down or deployed position when desired for use in training. In the down or deployed position, the forks 72 extend from a side 103 of the cart 102 such that they are generally parallel to the first and second planar surfaces 10,20. The forks 72 can be alternatively pivoted to a stowed position as desired, wherein the forks 72 are received within the carriage 74 such that the forks do not extend beyond the sides 103 of the cart 102, facilitating movement of the system 100 using the casters 30. The carriage 74 is slidably received in opposed vertical openings 78 of a pair of rails 76 that extend from the bottom 14 of the first planar surface 10 to the top 22 of the second planar surface 20. A hydraulic cylinder 140 is connectable to the second pump 114 using the quick connects 48 and hoses 52 to move the carriage 74, and thus the forks 72, up and down. In some embodiments, a second hydraulic cylinder 142 is also connectable to the second pump 114 using the quick connects 48 and hoses 52 to tilting the forks 72 as desired.

As shown in FIG. 3, when the tray 32 and the forks 72 are in the stowed position, none of the components of the system 100 extend beyond the sides 103 of the cart 102. For example, the reservoir 110, the motor 112, the first pump 114, the second pump 116, the steerable wheel 40, the steering wheel 60, tray 32 and forks 72 are situated within the periphery of the first and second planar surfaces 10,20 and do not extend significantly beyond sides 103 of the cart 102, thus facilitating movement of the system 100 as desired, including through standard doorways since the width dimension w is equal or less than 36 inches.

Figure 11A:
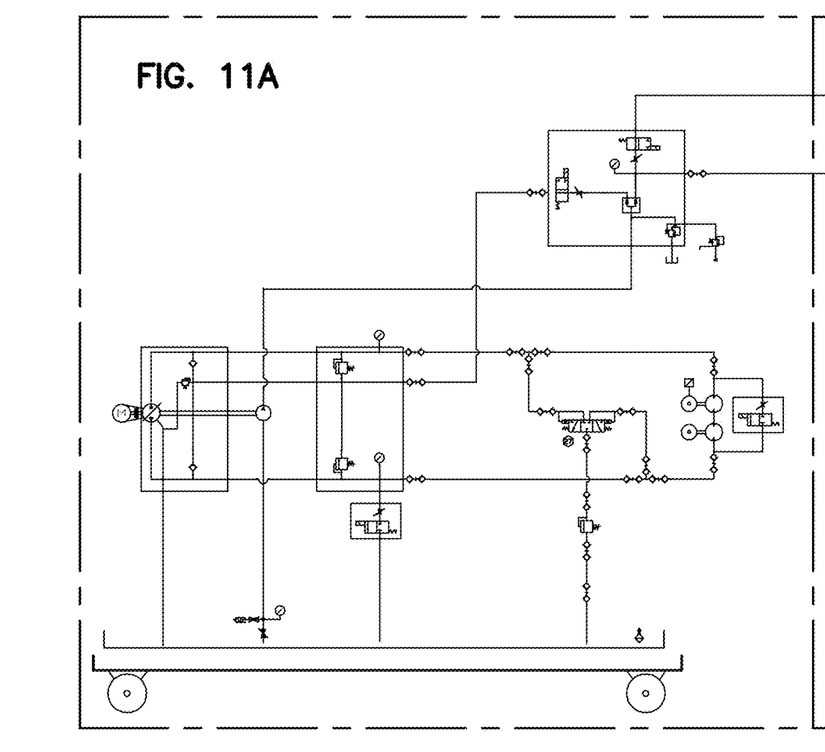
FIGS. 11A and 11B illustrate respective portions of the schematic diagram shown in FIG. 11.
Figure 11B:
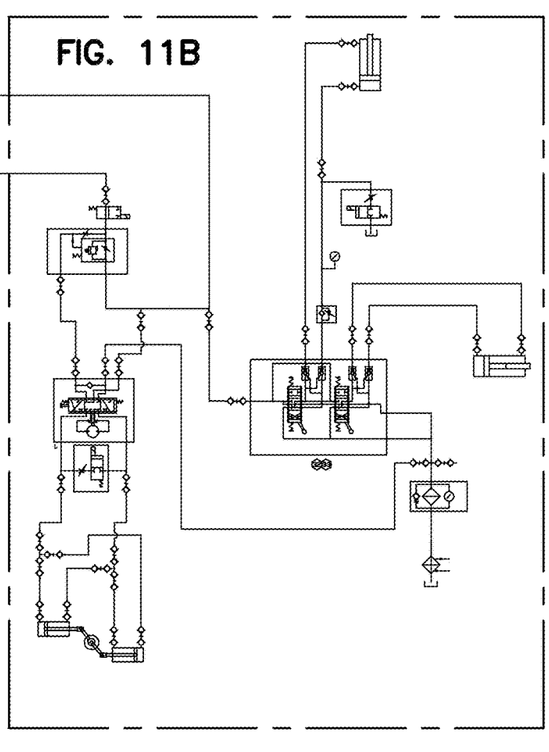

FIG. 11 is a hydraulic schematic diagram illustrating aspects of a hydraulic circuit used in an example of the system 100. FIGS. 11A and 11B illustrate the respective portions of the diagram shown in FIG. 11. The reservoir 110 supplies fluid to both the first pump 114 and the second pump 116. In some implementations, the first pump 114 is a lever operated, manual controlled, variable displacement closed circuit pump that is connectable to drive the drivable wheel 160. The first pump 114 may include a stroke limiter to physically limit the amount of displacement of the pump 114. The second pump 116, for example, is a fixed displacement vane pump that is used for charge, steering, and auxiliary work functions. As compared to other types of fixed displacement pumps, a vane pump requires a lower initial starting load on the electric motor 112.

The pumps 114,116 are mounted in tandem on the electric motor 112, and are sized to minimize the total amount of flow that can be delivered to reduce horsepower draw and still perform desired functions satisfactorily. This allows powering the motor 112 using a standard U.S. wall electrical outlet such that the system 100 can be used for training in a wide variety of environments. In certain embodiments, the motor 112 is a 1.5 horsepower, 1800 RPM, 115 volt/60 hz motor.

A relief valve 172 is hard plumbed to the outlet of the second pump 114, which will limit maximum pressure to 500 psi. Cross-port reliefs 162, which are also set at 500 psi, are connected to the outlets of the first pump 114. Downstream of the cross-port reliefs 162 are quick-disconnects 48 which, using the hoses 54, allow coupling of two drive motors 170 to the first pump 114 to drive the motors 170 and thus simulate vehicle propulsion. In the illustrated implementation, the drive motors 170 are connected in series, reducing the total amount of flow required which contributes to lower horsepower draw. Using the quick connects 48 and hoses 54, a hot oil shuttle valve 164 and replenishing relief valve can be added into the circuit to allow for cooler make-up fluid to be introduced into the loop, which serves as teaching exercise to illustrate the need for this in a transmission circuit to help control temperature. Similarly, in the illustrated circuit, a valve 168 is connected in parallel with the drive motors 170 that can be used by an instructor to demonstrate faulty or misadjusted cross port relief valve or a worn drive motor.

The outlet of the second pump 114 is also connected to a posi-trac flow divider 174 to divide flow from the second pump 116 between lift/tilt functions of the fork lift system 70 and the steering system 150. A posi-trac flow divider is used in some embodiments so that flow can be maintained to either outlet if one outlet is blocked. This allows for the use of only one function at a time or both if desired. The use of a posi-trac flow divider also helps to reduce pressure drop, and thus to reduce horsepower draw.

From the flow divider block 174, the steering system 150 and/or the fork lift system 70 can be plumbed as desired using the quick disconnect couplings 48 and the flexible hoses 52. A closed center steering valve 180 is controlled by the steering wheel 60. Other types of steering valves could be employed in alternative implementations. A priority valve 176 can further be included in-line before the steering valve 180 to demonstrate the need for such a component when sharing flow with other functions. A fault is selectable at this point to simulate a mis-adjusted or faulty priority valve. As noted above in conjunction with FIG. 6, two steering cylinders 152 are mounted in opposition to the yoke 44 having the steerable wheel 40 mounted therein. In some implementations, this represents the steered wheel on a forklift in the simulation system. The steering valve 180 is controlled by the steering wheel 60 to operate the steering cylinders 150 as desired to pivot the wheel 40 side to side. A valve 184 is operable to demonstrate partial or total loss of steering due to leaky seals in steering cylinders or a faulty steering valve.

The fork lift system 70 is controlled by the use of a two-spool monoblock directional control valve 190 that controls lift 140 and tilt 142 cylinders of the fork lift system 70 to simulate a forklift operation. A valve 192 is connected between the control valve 190 and the lift cylinder 140 to demonstrate a leaking counterbalance valve or leaking cylinder piston seals as desired by an operator.

A fluid conditioning subsystem 200 is included in the illustrated embodiment, including a filter 202 and a heat exchanger 204 for filtering and cooling the hydraulic fluid to maintain optimum reliability and extend the life of the components and fluid. A reservoir fill connection 210 is provided to facilitate pumping fluid into the system through the filter for initial filling or subsequent addition of fluid. In some embodiments, cavitation valve 212 is connected between the second pump 116 and the reservoir 110, and an aeration valve 214 is provided to selectively introduce air into the system to demonstrate cavitation.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A hydraulic training system, comprising:
a cart including a first planar surface oriented horizontally and having a top and a bottom, first and second opposing sides defining a length dimension, first and second opposing ends defining a width dimension, the first and second sides and first and second ends defining a perimeter;
a fluid reservoir situated on the cart;
a motor situated on the cart;
a first pump situated on the cart and in fluid communication with the fluid reservoir and operatively connected to be driven by the motor;
a drivable wheel rotatably mounted to the cart and extending from the top of the first planar surface, the drivable wheel selectively connectable to the first pump to rotate the drivable wheel;
a second pump situated on the cart and in fluid communication with the fluid reservoir and operatively connected to be driven by the motor;
a steerable wheel pivotally connected to and extending from the top of the first planar surface;
a steering system situated on the cart and selectively connectable to the second pump and arranged to steer the steerable wheel;
wherein the fluid reservoir, the motor, the first pump, the second pump, the rotatable wheel, and the steering system do not extend beyond the first and second sides of the first planar surface.

2. The system of claim 1, wherein the fluid reservoir, the motor, the first pump, and the second pump are situated below the first planar surface.

3. The system of claim 1, further comprising:
a second planar surface below and parallel to the first planar surface, the second planar surface having a top and a bottom, the bottom of the first planar surface facing the top of the second planar surface;
wherein the fluid reservoir, the motor, the first pump, and the second pump are situated between first planar surface and the second planar surface.

4. The system of claim 1, further comprising:
a plurality of casters rotatably attached to the cart.

5. The system of claim 1, further comprising a plurality of connectors extending from the top side of the first planar surface.

6. The system of claim 1, wherein the first pump is a hydrostatic piston pump.

7. The system of claim 1, wherein the second pump is a vane pump.

8. The system of claim 1, wherein the motor is mounted on the fluid reservoir.

9. The system of claim 1, wherein the first and second pumps are mounted in tandem to the motor.

10. The system of claim 1, wherein the motor is powered by 115 volt/60 hz.

11. The system of claim 1, further comprising:
a plurality of connectors extending from the top side of the first planar surface;
a drive motor for driving the drivable wheel;
a plurality of flexible hoses connectable to the plurality of connectors;
the drive motor connected to the first pump via the plurality of connectors and the plurality of flexible hoses.

12. The system of claim 11, wherein:
the drivable wheel includes first and second drivable wheels;
the drive motor includes first and second drive motors connected in series; and
the first drive motor drives the first drivable wheel;
the second drive motor drives the second drivable wheel.

13. The system of claim 1, wherein the steering system further includes:
a yoke pivotally connected to the first planar surface;
first and second hydraulic steering cylinders attached to the yoke;
a steering wheel extending from the top of the first planar surface;
the second pump being connectable to drive the first and second steering cylinders in response to the steering wheel.

14. The system of claim 1, further comprising a fork lift simulation system, the fork lift simulation system including:
a fork;
a carriage, the fork being pivotally connected to the carriage such that the fork has a deployed position wherein the fork extends beyond the first side of the first planar surface, and a stowed position wherein the fork does not extend beyond the first side of the first planar surface.

15. The system of claim 14, wherein the fork lift simulation system further includes:
a pair of rails extending from the bottom of the first planar surface perpendicular thereto, the rails slidably receiving the carriage;
a first hydraulic cylinder operable to move the carriage slidably in the rails;
the second pump being connectable to drive the first hydraulic cylinder.

16. The system of claim 15, wherein the fork lift simulation system further includes:
a second hydraulic cylinder operable to tilt the fork;
the second pump being connectable to drive the second hydraulic cylinder.

17. The system of claim 1, further comprising a valve connectable to one of the first and second pumps to simulate a fault in the system.

18. The system of claim 1, further comprising a tray pivotally connected to the first planar surface, the such that the tray has a deployed position wherein the tray extends parallel to the first planar surface and beyond the first side of the first planar surface, and a stowed position wherein the tray does not extend significantly beyond the first side of the first planar surface.

19. A fork lift simulation and training system, comprising:
a cart including a first planar surface oriented horizontally and having a top and a bottom, a second planar surface below and parallel to the first planar surface, the second planar surface having a top and a bottom, the bottom of the first planar surface facing the top of the second planar surface, the first and second planar surfaces each having first and second opposing sides defining a length dimension, first and second opposing ends defining a width dimension, the first and second sides and first and second ends defining a perimeter;
a fluid reservoir situated on the cart;
a motor situated on the cart;
a pump situated on the cart and in fluid communication with the fluid reservoir and operatively connected to be driven by the motor;
a fork;
a carriage having an upper end and a lower end situated inside the perimeter of the first and second planar surfaces, the fork being pivotally connected to the lower end of the carriage such that the fork has a deployed position wherein the fork extends beyond the first sides of the first and second planar surfaces and is generally parallel thereto, and a stowed position wherein the fork is pivoted to a vertical position and does not extend beyond the first sides of the first and second planar surfaces and is positioned entirely inside the perimeter of the first and second planar surface;
a pair of rails extending between the first and second planar surfaces perpendicular thereto, the rails slidably receiving the carriage;
a first hydraulic cylinder operable to move the carriage slidably in the rails;
an operator control extending from the top of the first planar surface;
the pump being connectable to the operator control and the first hydraulic cylinder to move the fork in response to the operator control.

20. The system of claim 19, further comprising:
a second hydraulic cylinder operable to tilt the fork;
the second pump being connectable to drive the second hydraulic cylinder in response to the operator control.

21. The system of claim 19, further comprising:
a second planar surface below and parallel to the first planar surface, the second planar surface having a top and a bottom, the bottom of the first planar surface facing the top of the second planar surface;
wherein the rails extend between the first and second planar surfaces.

22. A method, comprising:
providing a cart including casters and a first planar surface, the first planar surface oriented horizontally and having a top and a bottom, first and second opposing sides defining a length dimension, first and second opposing ends defining a width dimension, the first and second sides and first and second ends defining a perimeter;
situating a fluid reservoir on the cart;
situating first and second pumps on the cart such that the first and second pumps are in fluid communication with the fluid reservoir;
connecting a drivable wheel that is rotatably attached to the cart to the first pump to rotate the rotatable wheel and simulate vehicle propulsion;
connecting a steering system including a steering wheel extending from the top of the first planar surface to a steerable wheel pivotally attached to and extending from the top of the first planar surface and the second pump to steer the rotatable wheel in response to the steering wheel.

23. The method of claim 22, further comprising:
situating a motor on the cart;
driving the first and second pumps with the motor.

24. The method of claim 22, further comprising:
situating the fluid reservoir, the first pump, the second pump, the steerable wheel, the drivable wheel and the steering wheel such that they do not extend beyond the first and second sides of the first planar surface.

25. The method of claim 22, further comprising:
pivoting a fork to a deployed position wherein the fork extends beyond the first side of the first planar surface;
moving the fork to simulate a fork lift system using the second pump;
pivoting the fork to a stowed position wherein the fork does not extend beyond the first side of the first planar surface.

26. The method of claim 22, further comprising:
connecting a hydraulic cylinder to the fork;
driving the hydraulic cylinder with the second pump to move the fork.

27. The method of claim 22, further comprising:
connecting a valve to one of the first and second pumps to simulate a fault in the system.

28. The system of claim 19, further comprising:
a drivable wheel rotatably mounted to the cart and extending from the top of the first planar surface;
a steerable wheel pivotally connected to and extending from the top of the first planar surface; and
a steering system situated on the cart and arranged to steer the steerable wheel.

29. The system of claim 19, wherein the steering system is selectively connectable to the pump.

30. The system of claim 29, further comprising:
a second pump situated on the cart and in fluid communication with the fluid reservoir and operatively connected to be driven by the motor;
wherein the drivable wheel is selectively connectable to the second pump to rotate the drivable wheel.

* * * * *